United States Patent [19]

Lisak

[11] Patent Number: 5,163,746
[45] Date of Patent: * Nov. 17, 1992

[54] ASSEMBLY FOR HEADLAMP ADJUSTMENT

[75] Inventor: Stephen P. Lisak, Arab, Ala.

[73] Assignee: Textron Inc., Rockford, Ill.

[*] Notice: The portion of the term of this patent subsequent to Jan. 7, 2009 has been disclaimed.

[21] Appl. No.: 629,421

[22] Filed: Dec. 18, 1990

Related U.S. Application Data

[63] Continuation-in-part of Ser. No. 517,232, May 1, 1990, Pat. No. 5,079,676.

[51] Int. Cl.$^5$ ............................................. B60Q 1/06
[52] U.S. Cl. .................................. 362/66; 362/80; 362/270; 362/428
[58] Field of Search ............... 362/61, 66, 80, 269, 362/270, 273, 418, 419, 423, 424, 425, 427, 428, 430, 69, 70, 285, 287

[56] References Cited

U.S. PATENT DOCUMENTS

| | | | |
|---|---|---|---|
| 4,108,025 | 8/1978 | Stine et al. | 81/3 R |
| 4,665,469 | 5/1987 | Furfari et al. | 362/66 |
| 4,674,018 | 6/1987 | Ryder et al. | 362/424 |
| 4,689,725 | 8/1987 | Saijo et al. | 362/66 |
| 4,707,769 | 11/1987 | Van Duyn | 362/80 |
| 4,713,739 | 12/1987 | Ryder et al. | 362/424 |
| 4,796,494 | 1/1989 | Eckenrode et al. | 81/484 |
| 4,843,523 | 6/1989 | Nakamura | 362/422 |
| 4,882,658 | 11/1989 | Allen | 362/61 |
| 4,893,219 | 1/1990 | Lisak | 362/66 |
| 4,916,587 | 4/1990 | Hirosa et al. | 362/430 |

Primary Examiner—Richard R. Cole

[57] ABSTRACT

An adjusting mechanism for alignment of a vehicle headlamp or the like includes a molded housing in which an adjusting gear is journaled and movably coupled to an adjusting member so that rotation of the adjusting gear imparts linear movement to the adjusting member for adjusting orientation of the headlamp. The housing includes first and second portions thereof which are joined by clamping the second housing portion between the first housing portion and a support structure to which the adjusting mechanism is secured. Clamping structure can be integrally provided on the first housing portion and secured directed to the support structure so that separate fasteners are eliminated. The clamping structure on the first housing portion can be a plurality of resiliently deflectable coupling hooks projecting therefrom. The hooks are resiliently deflected and inserted through receiving aperture in a supporting panel of the vehicle so that the hooks are snap-fitted against peripheral edges of the aperture in locking engagement to retain the clamped securement of the cap.

30 Claims, 1 Drawing Sheet

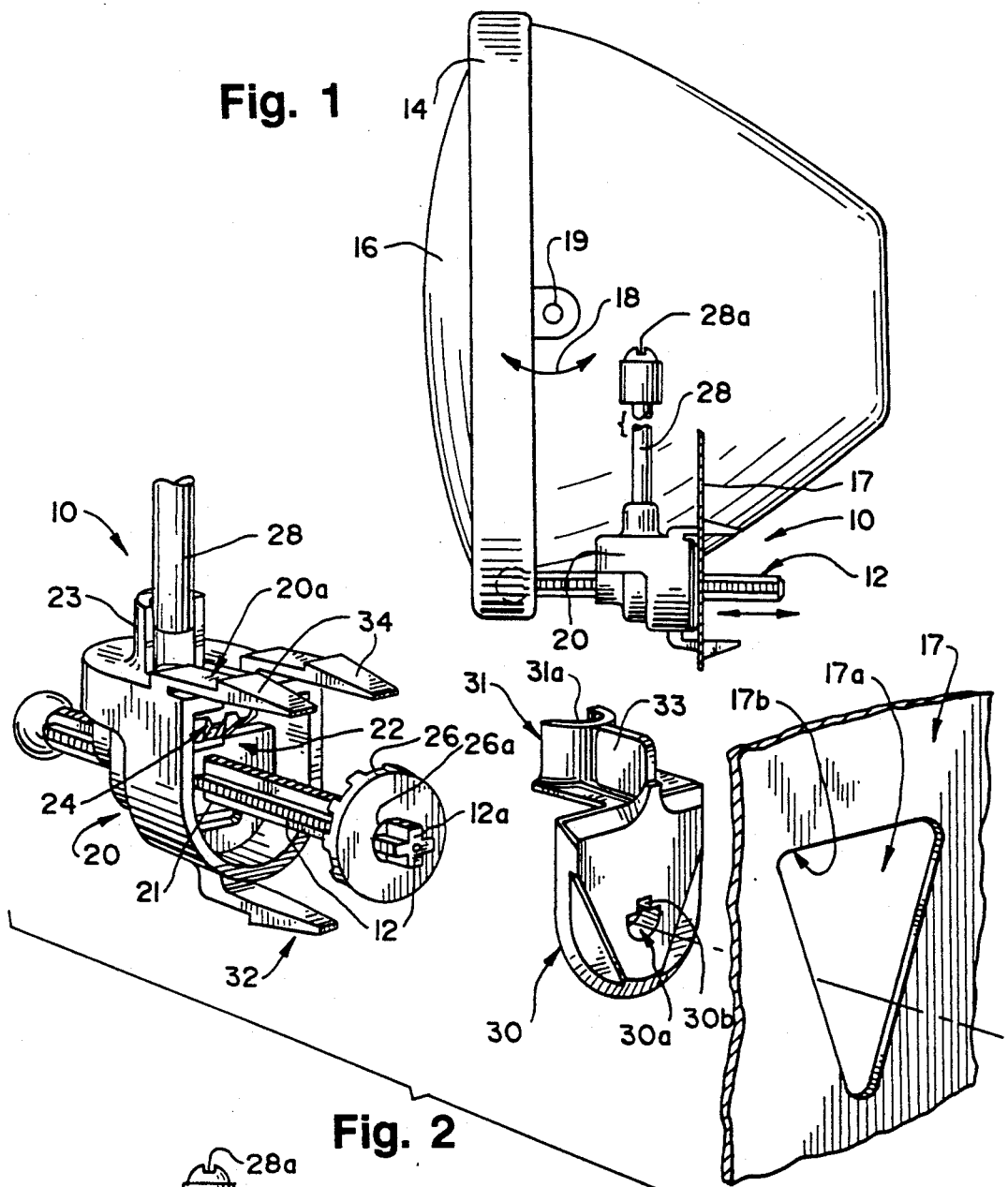
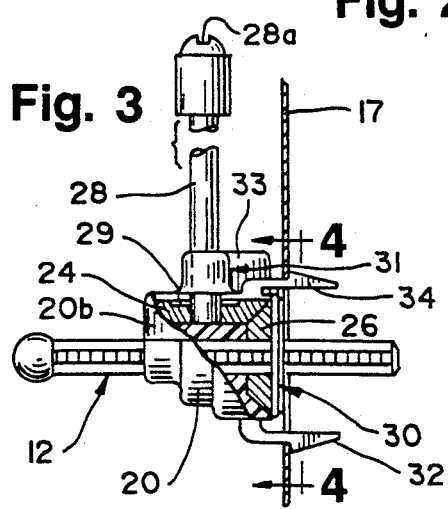
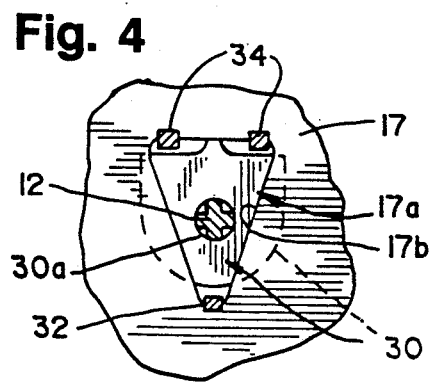

ASSEMBLY FOR HEADLAMP ADJUSTMENT

CROSS-REFERENCE TO RELATED APPLICATION

This application is a Continuation-in-Part of my co-pending Ser. No. 517,232, filed May 1, 1990, entitled Improved Headlamp Adjusting Assembly now U.S. Pat. No. 5,079,676, which is owned by the same assignee of this application.

BACKGROUND OF THE INVENTION

The present invention relates to adjusting mechanism for alignment of automobile headlamps or the like, and more particularly relates to an improved assembly and construction of such mechanisms.

Particularly successful modern adjusting mechanism for alignment of vehicle headlamps are described for example in U.S. Pat. Nos. 4,674,018 and 4,893,219. In the described mechanisms, an adjusting screw is coupled to the headlamp housing and extends into a gear box or adjustment mechanism. The adjusting screw is operatively coupled to an adjusting drive shaft which is operated by conventional hand tools, by means of a pair of mitered gears and a threaded connection. The gear members can be assembled and sealed within the integral gear housing, while allowing the drive shaft and adjusting screw components to be assembled at a later time with a variety of shaft and screw lengths as required for different model automobiles.

The gear assembly of the adjusting mechanism described in these patents has been enclosed within two-part or three-part housing structures which are assembled and joined by ultrasonic welding or adhesive bonding. The present invention provides simplified assembly of the housing in such headlamp adjusting mechanism as well as simplified mounting of the adjusting mechanism on the supporting structure of the vehicle in which the headlamp is installed.

SUMMARY OF THE INVENTION

In accordance with the present invention, an adjusting mechanism for alignment of a vehicle headlamp or the like includes a molded housing in which a pair of mitered gears are journaled and movably coupled to an adjusting member so that rotation of the gear members imparts linear movement to the adjusting member for changing the vertical or horizontal orientation of the headlamp. The housing includes first and second portions thereof which are joined by clamping the second housing portion between the first housing portion and a support structure to which the adjusting mechanism is secured. Clamping structure is integrally provided on the first housing portion and secured directly to the support structure so that separate mounting fasteners are eliminated.

In a preferred embodiment, the first housing portion includes a plurality of resiliently deflectable coupling hooks projecting therefrom. The coupling hooks extend beyond the second housing portion which forms a cap to close the journaling bore for the adjusting gear. The extension of the coupling hooks enables the hooks to be resiliently deflected and inserted through receiving aperture in a supporting panel of the vehicle so that the hooks are snap-fitted against peripheral edges of the aperture in locking engagement to retain the clamped securement of the cap between the main first housing portion and the panel. The resulting clamped assembly eliminates any need for bonding or ultrasonic welding of the cap to the housing.

BRIEF DESCRIPTION OF THE DRAWINGS

FIG. 1 is a side elevational view of one embodiment of the adjusting mechanism according to the invention coupled for adjustment of a headlamp alignment;

FIG. 2 is an exploded perspective view of the adjusting mechanism shown in FIG. 1;

FIG. 3 is a sectional view of the adjusting mechanism shown in FIGS. 1 and 2; and FIG. 4 is a sectional view of the adjusting mechanism at a plane through line 4—4 in FIG. 3, in which the housing cap portion of the adjusting mechanism in FIG. 3 has been omitted for clarity of the remaining sectional view.

DESCRIPTION OF THE ILLUSTRATED EMBODIMENT

Referring to FIG. 1, an embodiment of the adjusting mechanism according to the invention, designated generally by reference character 10, includes an adjusting screw 12 which has its distal end affixed to the headlamp housing 14 which holds the headlamp assembly designated generally 16. The adjusting mechanism 10 is mounted on a panel 17 of the vehicle (not shown) as more fully described hereinafter. In the illustrated embodiment the adjusting screw 12 is fixed against rotation and thus can only move linearly in response to rotation of the internal gearing within the mechanism 10. The linear motion of the screw 12 generated by the mechanism 10 causes the headlamp housing 14 to pivot through an arc 18 about a pivot bearing 19 in order to adjust the vertical alignment of the headlamp 16 in the configuration shown in FIG. 1. In practice, additional adjusting mechanisms 10 are employed to attain horizontal adjustment of the headlamp.

Referring now to the exploded view in FIG. 2, the adjusting mechanism 10 includes a unitary molded main housing 20 within which a main cavity 22 is formed. The cavity 22 has an internal structure providing multiple shoulders and ledges which define a pair of intersecting gear-journaling bores or chambers which receive a bevel-meshed drive gear and adjusting gear generally designated by respective reference numerals 24 and 26. The gears 24 and 26 are mitered gears and are of relatively standard design.

The adjusting gear 26 has a central, internally threaded bore 26a in which the externally threaded adjusting screw 12 is engaged, and projects from both ends thereof as well as translating through the housing 20 as indicated in FIGS. 1 and 3.

As best shown in FIG. 3, the drive gear 24, which drives the adjusting gear 26, is coupled to one end of a drive shaft 28 having a drive head 28a which can be turned by suitable tooling such as a screwdriver (not shown). The drive gear 24 preferably has multi-lobular configured coupling recess which receives the mating end of the drive shaft 28 as more fully described in my aforementioned, co-pending application Ser. No. 517,232.

In alternative embodiments, the drive shaft and drive gear can be integrally molded to eliminate the need for coupling, or the drive shaft can be insert molded into the gear, and in either modification the bearing of the cap tongue against the shaft flange will prevent withdrawal of the drive shaft as well as provide vibrational stability of the drive gear and the meshed adjusting gear.

In assembling the adjusting mechanism 10, the coupling end of the drive shaft 28 is inserted into the drive gear 24, after which the drive gear 24 is slidably inserted into the gear receiving bore of the cavity 22 so that the shaft 28 projects through the open slot 20a in the upper wall of the housing 20. Then the adjusting screw 26 can be inserted into the cavity 22 meshing with the drive gear 24. A housing cap member 40 is then installed on the main housing 20 to close the cavity 22 and engage the back of the adjusting gear 26 to maintain the meshing of the gears 24 and 26. A bonding operation to ultrasonically weld or otherwise bond the cap 30 to the main housing 20, can be eliminated, and simplified joining of the cap 30 and main housing 20 is maintained by clamping the cap 30 between the main housing 20 and the structural panel 17 or similar wall of the vehicle adjacent the headlamp housing 14. The clamp joint is achieved in the illustrated embodiment by providing the main housing 20 with three rearwardly projecting, hooked couplers 32, 34 arranged in a pattern in which one coupler 32 projects from the bottom of the housing 20 and a spaced pair of couplers 34 project from the upper wall of the housing 20 straddling the slot 20a as best shown in FIG. 2. The couplers 32, 34 project generally perpendicular to the cavity-closing wall of the cap 30, and are resiliently deflectable to enable a snap-fit installation through a coupling aperture 17a formed through the panel 17. The hooked couplers 32, 34 thus lock against the peripheral surfaces 17b of the aperture 17a to clamp the cap 30 against the main housing 20 and the panel 17 as best shown in FIGS. 3 and 4. The couplers 32,34 also provide three locations of locking securement to prevent any rotation of the mechanism 10.

In the illustrated embodiment, the adjusting screw 12 is prevented from rotating and is capable of translational motion only, upon rotation of the adjusting gear 26; to prevent rotation, the adjusting screw 12 has a fabricated configuration with a non-circular cross-section, and in the illustrated embodiment, the screw 12 has a cruciform cross-section. The cap 30 is provided with an aperture which allows translational passage of the screw 12 therethrough for proper pivotal motion of the headlamp housing 14, however, the aperture 30a has a configuration including a radially extending slot 30b which receives one arm 12a of the cruciform cross-section of the screw 12 to provide the rotational interference which guides only translational motion of the screw 12 during the adjustment operation. Preferably, the front wall 20b of the main housing 20 also has a screw aperture 21 and configuration which provides rotational interference with the screw 12 while allowing translational passage to ensure that the screw 12 cannot rotate which could otherwise cause aberant force tending to misalign the pivot bearing 19. Suitable modifications of the cruciform cross-sectional configuration of the screw and corresponding housing apertures can be employed to prevent rotation of the screw.

Referring again to FIGS. 2 and 3, in the illustrated embodiment, the drive shaft 28 includes an annular, radially projecting retainer flange 29 (FIG. 3) which fits within a recess in the drive gear 24 and is retained therein by the upper wall of the housing 20 and the bottom surface of the forwardly projecting tongue portion 31 of the cap 30, as more fully described in my aforementioned application Ser. No. 517,232. The tongue 31 closes the slot 20a and also includes an upstanding, arcuate portion 31a which forms one-half of a split journal with portion 23 of the housing 20, to promote supporting alignment of the drive shaft 28. The tongue portion 31 also includes a support flange 33 rearwardly extending from the arcuate, journaling portion 31a to ensure rigidity thereof.

While particular embodiments of the present invention have been described herein, it will be obvious to those skilled in the art that changes and modifications in various aspects may be made without departing from the broad scope of the invention. Consequently, the scope of the invention is not limited by any particular embodiment but is defined by the appended claims and the equivalents thereof.

I claim:

1. An adjusting mechanism particularly for use in alignment of a headlamp, comprising:
    housing means including first and second portions thereof;
    adjusting means within said housing means for adjusting orientation of said headlamp; and
    coupling structure including at least one resiliently deflectable coupling member projecting from said housing means for snap-fitted coupling of said housing means to a support structure and clamping of said second housing portion between said first housing portion and said support structure.

2. An adjusting mechanism according to claim 1, wherein said coupling member comprises hook means for locking insertion through a receiving aperture formed in said support structure.

3. An adjusting mechanism according to claim 2 wherein said hook means includes a clamping surface for clamping engagement against a peripheral surface of said receiving aperture in said support structure.

4. An adjusting mechanism according to claim 1 wherein said adjusting means comprises an adjusting member projecting through an aperture formed in said housing means, for movably adjusting said headlamp orientation.

5. An adjusting mechanism according to claim 4 wherein said housing means aperture has a cross-sectional configuration interfering with rotation of said adjusting member for preventing rotation while allowing linear movement therethrough.

6. An adjusting mechanism for a headlamp comprising: a housing having a gear-journaling bore and an aperture through said housing; a drive gear rotatably journaled in said bore; a drive shaft extending through said housing aperture and secured to said gear within said bore; and a retainer member on said drive shaft within said bore separate from said drive gear and bearing against said housing in order to prevent retractive axial motion of said drive shaft.

7. An adjusting mechanism according to claim 6 wherein said housing comprises a cap portion closing said bore and bearing against said retainer member.

8. An adjusting mechanism according to claim 6, wherein said retainer member comprises an annular flange radially extending from said drive shaft and wherein said cap portion includes spaced arm members straddling said drive shaft and bearing against said annular flange.

9. An adjusting mechanism according to claim 6 wherein said cap portion includes an aperture through which said drive shaft extends and wherein a peripheral surface of said cap aperture provides said bearing against said retainer portion of said drive shaft.

10. An adjusting mechanism according to claim 6, wherein said gear housing further comprises a second bore providing rotatable journaling of a second gear therein which is rotatably meshed with said drive gear.

11. An adjusting mechanism according to claim 6 wherein said shaft and said gear are integral.

12. An adjusting mechanism for alignment of a headlamp, comprising:
   molded housing means including first and second portions thereof and having a gear journaling bore for rotation of an adjusting gear journaled therein;
   an adjusting member movably coupled to said adjusting gear such that rotation of said adjusting gear imparts linear movement to said adjusting member for adjusting orientation of said headlamp; and
   clamping means for clamping said second housing portion between said first housing portion and a support structure, in order to maintain clamped joining of said first and second housing portions and securement of said housing means to said support structure, wherein said clamping means comprises a plurality of resiliently deflectable coupling members projecting from said housing for snap-fitted coupling to said support structure.

13. An adjusting mechanism according to claim 12, wherein said clamping means is integrally formed on said first housing portion.

14. An adjusting mechanism according to claim 12, wherein said clamping means comprises coupling structure projecting from said first housing portion for coupling to said support structure.

15. An adjusting mechanism according to claim 12, wherein at least one of said coupling members comprises hook means for locking insertion through a receiving aperture formed in said support structure.

16. An adjusting mechanism according to claim 15, wherein said hook formation includes a clamping surface for clamping engagement against a peripheral surface of said receiving aperture in said support structure.

17. An adjusting mechanism according to claim 12 wherein said first housing portion includes said gear journaling bore and said second housing portion includes a cap member having an interior surface defining one end of said gear journaling bore.

18. An adjusting mechanism according to claim 17, wherein said clamping means comprises at least one coupling member projecting from said first housing portion and directed generally perpendicular to said interior surface of cap member.

19. An adjusting mechanism according to claim 18, wherein a plurality of said coupling members project from said first housing portion and wherein said cap member is clamped to said first housing portion between at least two of said coupling members.

20. An adjusting mechanism according to claim 19, wherein said plurality of coupling members generally circumscribe said clamped cap member.

21. An adjusting mechanism according to claim 17, wherein said adjusting member projects through an aperture formed in said cap member.

22. An adjusting mechanism according to claim 12 in combination with said support structure.

23. An adjusting mechanism according to claim 22 wherein said support structure includes aperture means cooperating with said clamping means in said clamped securement.

24. An adjusting mechanism according to claim 23, wherein said first housing portion includes at least one coupling member projecting through said aperture means of said support structure.

25. An adjusting mechanism according to claim 23, wherein said support structure comprises a generally planar panel through which said aperture means is formed.

26. An adjusting mechanism for alignment of a headlamp, comprising: molded housing means including a first housing portion having a gear journaling bore for rotation of an adjusting gear journaled therein, and a second housing portion including a cap member having an interior surface defining one end of said gear journaling bore; and adjusting member movably coupled to said adjusting gear such that rotation of said adjusting gear imparts linear movement to said adjusting member for adjusting orientation of said headlamp; and clamping means for clamping said cap member between said first housing portion and a support structure, in order to maintain clamped joining of said cap member and first housing portion and securement of said housing means to said support structure, wherein said clamping means comprises at least one resiliently deflectable coupling hook projecting from said first gear housing portion through aperture means in said support structure, said coupling hook being snap-fitted against a peripheral edge of said aperture means in locking engagement to obtain said clamped joining and securement.

27. An adjusting mechanism according to claim 26, wherein said first gear housing portion further comprises a second bore providing rotatable journaling of a drive gear therein which is rotatably meshed with said adjusting gear to drive the movement of said adjusting member.

28. An adjusting mechanism according to claim 26, wherein said clamping means comprises at least one resiliently deflectable coupling hook projecting from said first gear housing portion through aperture means in said support structure, said coupling hook being snap-fitted against a peripheral edge of said aperture means in locking engagement to obtain said clamped joining and securement.

29. An adjusting mechanism for alignment of a headlamp, comprising:
   molded housing means including first and second portions thereof and having a gear journaling bore for rotation of an adjusting gear journaled therein;
   an adjusting member movably coupled to said adjusting gear such that rotation of said adjusting gear imparts linear movement to said adjusting member for adjusting orientation of said headlamp; and
   clamping means for clamping said second housing portion between said first housing portion and a support structure, in order to maintain clamped joining of said first and second housing portions and securement of said housing means to said support structure,
   wherein said first housing portion includes said gear journaling bore and said second housing portion includes a cap member having an interior surface defining one end of said gear journaling bore, and wherein said clamping means comprises a plurality of coupling members projecting from said first housing portion and circumscribing said cap member for clamping said cap member between at least two of said coupling members, said cap member further comprising an aperture through which said adjusting member projects wherein said cap aperture has a cross-sectional configuration interfering with rotation of said adjusting member for preventing rotation thereof during said linear movement.

30. An adjusting mechanism and support structure therefor, for alignment of a headlamp, comprising:

molded housing means including first and second portions thereof and having a gear journaling bore for rotation of an adjusting gear journaled therein;

an adjusting member movably coupled to said adjusting gear such that rotation of said adjusting gear imparts linear movement to said adjusting member for adjusting orientation of said headlamp; and clamping means for clamping said second housing portion between said first housing portion and a support structure, in order to maintain clamped joining of said first and second housing portions and securement of said housing means to said support structure, wherein said support structure includes aperture means and said first housing portion comprises a plurality of resiliently deflectable coupling hooks projecting from said first housing member through said support structure aperture means, said coupling hooks being snap-fitted against peripheral edges of said support structure aperture means in locking engagement to retain said clamped securement.

* * * * *